United States Patent
Erickson et al.

(10) Patent No.: US 6,426,394 B1
(45) Date of Patent: Jul. 30, 2002

(54) METHOD OF POLYMERIZING OLEFINS USING UNSUPPORTED CATALYST COMPOSITIONS

(75) Inventors: Kersten Anne Erickson, South Charleston; Jody M. Moffett, Charleston, both of WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/458,334

(22) Filed: Dec. 10, 1999

(51) Int. Cl.⁷ .................................................. C08F 4/42
(52) U.S. Cl. ........................ 526/160; 526/348; 526/901; 526/943; 526/119; 526/158; 502/152
(58) Field of Search ................................ 526/160, 348, 526/901, 943, 119, 158; 502/152

(56) References Cited

U.S. PATENT DOCUMENTS 5,317,036 A * 5/1994 Brady, III et al. .......... 523/223
5,852,143 A * 12/1998 Sishta et al. ................. 526/127

* cited by examiner

*Primary Examiner*—David W. Wu
*Assistant Examiner*—Ling-Siu Choi

(57) ABSTRACT

Methods of polymerizing olefins in the gas phase using unsupported catalyst compositions are disclosed. At least one olefin monomer is polymerized in a gas phase reactor in the presence of an unsupported liquid catalyst composition whereby the method reduces reactor fouling by maintaining the partial pressure of the primary olefin monomer that is polymerized below about 240 psi. in the reactor. The invention is particularly useful for, but is not limited to polymerizing propylene or copolymerizing propylene with olefins having two or more carbon atoms. The method described herein produces a polymer product having controlled, uniform particle size, narrow molecular weight distribution, high bulk density and stereoregularity, and prevents and/or inhibits reactor fouling during catalyst delivery and during polymerization.

8 Claims, No Drawings

METHOD OF POLYMERIZING OLEFINS USING UNSUPPORTED CATALYST COMPOSITIONS

BACKGROUND OF THE INVENTION

1. Field of the Invention

The present invention relates to methods of polymerizing olefins in the gas phase using unsupported catalyst compositions. At least one olefin monomer is polymerized in a gas phase reactor in the presence of an unsupported liquid catalyst composition whereby the method reduces reactor fouling by maintaining the partial pressure of the primary olefin monomer that is polymerized below about 240 psi. in the reactor. The invention is particularly useful for, but is not limited to polymerizing propylene or copolymerizing propylene with olefins having two or more carbon atoms. The method described herein produces a polymer product having controlled, uniform particle size, narrow molecular weight distribution, high bulk density and stereoregularity, and prevents and/or inhibits reactor fouling during catalyst delivery and during polymerization.

2. Description of Related Art

Gas phase polymerization of olefin monomers to produce polyolefins is well known in the art. Various polyolefins can be produced including homopolymers, copolymers and terpolymers of α-olefins and optionally including dienes, aromatic compounds with vinyl unsaturation and/or carbon monoxide. A catalyst typically is required to initiate polymerization of one or more of the α-olefin monomers, and the optional dienes, etc. Typical catalysts include, but are not limited to, coordinated anionic catalysts, cationic catalysts, free-radical catalysts, anionic catalysts and the like. As described more fully, inter alia, in U.S. Pat. Nos. 3,779,712, 3,876,602 and 3,023,203, these known catalysts are introduced to the reaction zone as solid particles whereby the active catalyst material is supported on an inert support typically made of alumina, silica and the like. It was generally known in the art that delivering conventional catalysts to a gas phase reactor that were unsupported would result in numerous problems in catalyst delivery, as well as undesirable polymer properties.

Recent developments in the industry, however, have led to the discovery of a class of unsupported catalysts, some of which are typically referred to as metallocenes, or single site catalysts. Delivery of liquid, unsupported catalysts to a gas phase reactor was first described in Brady et al., U.S. Pat. No. 5,317,036, the disclosure of which is incorporated herein by reference in its entirety. Brady recognized disadvantages of supported catalysts including, inter alia, the presence of ash, or residual support material in the polymer which increases the impurity level of the polymer, and a deleterious effect on catalyst activity because not all of the available surface area of the catalyst comes into contact with the reactants. Brady further described a number of advantages attributable to delivering a catalyst to the gas phase reactor in liquid form.

These advantages included a cost savings since there were no costs associated with providing the support material, and processing the support so as to impregnate the active catalyst thereon. In addition, a high catalyst surface area to volume ratio was achieved thereby resulting in improved catalytic activity. Moreover, it was more efficient since the catalytic solid no longer needed to be separated and processed (filtered, washed, dried, etc.), and then handled and transported.

Despite these advantages, the solid catalytic material still needed to be dissolved in a suitable solvent and delivered to the gas phase reactor in the solvent. Many, if not all, of the single site metallocene catalysts which may polymerize olefins, and especially propylene isotactically, such as metallocene dichlorides, are difficult to use because they are insoluble in hydrocarbon solvents such as alkanes. Other unsupported catalysts that may polymerize olefins also are not readily soluble in hydrocarbon solvents, or require significant amounts of hydrocarbon to dissolve the unsupported catalysts. Solvents such as toluene and methylene chloride, although capable of solvating such catalysts, are undesirable because they are toxic in nature and leave undesirable residues. Even in these types of solvents, however, solubilities still can be very low, typically less than 21 mmol/l in concentration at room temperature. In addition, feeding unsupported catalysts to a gas phase reactor using large quantities of solvents (hydrocarbon or otherwise) can cause reactor fouling to occur, as described, for example, in Burkhardt, et al., U.S. Pat. No. 5,240,894, the disclosure of which is incorporated by reference herein in its entirety.

As stated therein, unsupported metallocene and organoaluminum catalyst systems suffer from the limiting disadvantage of producing polymer which sticks to the reactor walls during the polymerization process or polymer having small particle size and low bulk density which limit their commercial utility. Typically, polymer particle size and bulk density are determined by the morphological properties of the catalyst solid component (i.e., an inert carrier or support media). Poor particle size of the final polymer product can often result without a solid component in the polymerization media. Likewise, maintaining commercially acceptable levels of catalyst activity with minimal levels of reactor fouling occurring during polymerization, is also a problem.

Burkhardt also teaches that low catalytic activity and reactor wall fouling which occurs during polymerization may be due to several factors. When methyl alumoxane (MAO) is used as cocatalyst in the polymerization at temperatures about or greater than 40° C., the MAO dissolves and extracts the metallocene catalyst from the support and forms a soluble catalyst in the polymerization medium, or if an unsupported catalyst is employed, the catalyst already is soluble in the MAO solution. This soluble catalyst easily deposits polymer onto the reactor walls and/or generates very small particles of low bulk density which are undesirable in a commercial reactor.

In addition, when a liquid catalyst is employed in gas phase polymerization, several phenomena can occur. First, the soluble or liquid catalyst tends to deposit on the resin or polymer forming the fluidized bed which in turn leads to accelerated polymerization on the surface of the particles of the bed. As the coated resin particles increase in size, they are exposed to a higher fraction of catalyst solution or spray because of their increased cross-sectional dimensions. If too much catalyst is deposited on the polymer particles, they can grow so large that they cannot be fluidized thereby causing reactor shut down.

Second, using liquid catalyst under conditions of high catalyst activity, e.g., a liquid metallocene catalyst, the initial polymerization rate is often so high that the newly formed polymer or resin particles can soften or melt, adhering to larger particles in the fluidized bed. This needs to be avoided or minimized to avert reactor shutdown.

On the other hand, if the polymer particle size is too small, entrainment can occur resulting in fouling of the recycle line, compressor, and cooler and increased static electricity can occur leading to sheeting,—and ultimately, reactor shut down.

SUMMARY OF THE INVENTION

Thus, there exists a need to develop a mechanism by which unsupported catalysts can effectively be delivered to a gas phase polymerization reactor without causing reactor fouling, and without causing polymer agglomeration. There also exists a need to develop a method of polymerizing at least one olefin monomer using an unsupported catalyst, where the polymerization process can proceed smoothly and produce polymer in high yield. It is therefore an object of the invention to provide a method of polymerization that does not suffer from the aforementioned problems, and that satisfies the needs discussed above.

In accordance with these and other objects of the present invention, there is provided a method of making a polymer in a gas phase polymerization reactor comprising contacting an olefin monomer, preferably propylene, with an unsupported olefin polymerization catalyst composition in liquid form, whereby the monomer partial pressure in the reactor is below about 240 psi. In accordance with an additional object of the present invention, there is provided a method of making a polymer in a gas phase polymerization reactor comprising contacting an olefin monomer with a preactivated unsupported olefin polymerization catalyst composition in liquid form, whereby the monomer partial pressure in the reactor is below about 240 psi. These and other objects of the invention will be readily apparent to those skilled in the art upon review of the detailed description that follows.

DETAILED DESCRIPTION OF PREFERRED EMBODIMENTS

Throughout this description, the expression "liquid form" denotes solutions that contain the preactivated unsupported catalyst whereby the unsupported catalyst is dissolved therein, or is in the form of a slurry. Throughout this description, the term "polyolefin" denotes homopolymers, copolymers, and terpolymers of $\alpha$-olefins and may optionally contain dienes, aromatic compounds with vinyl unsaturation and/or carbon monoxide.

It is preferred in the present invention that the unsupported catalyst precursor is insoluble in aliphatic or alicyclic hydrocarbons, or only slightly soluble therein. Throughout this description, the expression "unsupported catalyst precursor" denotes a catalytic solid material that is capable of polymerizing $\alpha$-olefins (with or without a co-catalyst) without being supported on, inter alia, magnesium chloride, silica, magnesium ethoxide, and the like. In addition, the expressions "preactivated unsupported catalyst," or "preactivated unsupported olefin polymerization catalyst" as they may be used herein interchangably, denote an unsupported catalyst that has been contacted with a co-catalyst for a period of time prior time sufficient to generate a catalytic material ("preactivated unsupported catalyst") that, when used to polymerize $\alpha$-olefins, has an activity about the same or higher than the activity of the combination of unsupported catalyst and co-catalyst that were not contacted prior to injection into the reactor, or that were contacted for a period of time less than about 40 minutes. It is preferred to form a preactivated unsupported olefin polymerization catalyst by contacting an unsupported catalyst precursor and co-catalyst for a period of time sufficient to change the color of the reaction solution. Here, the unsupported catalysts were initially yellow to yellow-orange. After activation by contacting the unsupported catalyst with a co-catalyst, the solution would turn orange-red to deep red. Solutions that remained yellow or only partially light orange were not very active and thus, were not considered to contain a sufficient amount of "preactivated unsupported catalyst."

In accordance with preferred embodiments of the present invention, the unsupported catalyst and the co-catalyst (or "co-activator") are first contacted with one another, and then additional solvent is added, and the resulting mixture is reacted for more than about 40 minutes, but they can be reacted for as long as desired. That is, the solution containing the unsupported catalyst and co-catalyst and additional solvent can be stored indefinitely. It is preferred, however, to use the solution containing the preactivated unsupported catalyst within less than about 3 months of storage, more preferably, less than 1 month, and most preferably, less than 1 week. In one preferred embodiment of the invention, the unsupported catalyst and co-catalyst are reacted for greater than about 50 minutes, the solution then is passed through a filtering medium to remove any solids, and then the solution is stored for about 1 to about 10 days, preferably, from about 1 to about 6 days, and more preferably from about 1 to about 4 days.

It is preferred to contact the unsupported catalyst and co-catalyst at temperatures within the range of from about −20 to about 80° C., preferably about 0 to about 60° C., and at pressures of up to about 300 psi, preferably, up to about 20 psi. Because it is preferred to inject the catalyst solution at higher dilution than that obtained simply by using the hydrocarbon solvent medium used to dissolve the co-catalyst, additional solvent typically is required. The present inventors have discovered, however, that it is preferred to contact the unsupported catalyst precursor and co-catalyst with one another first, and then add additional solvent to effectively prevent plugging of the catalyst injection tube and to effectively inhibit reactor fouling. Those skilled in the art are capable of preparing a preactivated unsupported catalyst utilizing the guidelines provided herein, and by reference to U.S. patent application Ser. Nos. 09/223,399 and 09/222,638, the disclosures of which are incorporated by reference herein in their entirety.

Gas phase polymerization reactions typically are carried out in fluidized bed reactors and stirred or paddle-type reaction systems. Typical fluidized bed gas phase polymerization reactions are described, inter alia, in Brady et al., U.S. Pat. No. 5,317,036. While the following discussion will feature fluidized bed systems, where the present invention has been found to be preferred and especially advantageous, it is understood that the general concepts relating to the use of an unsupported catalyst in liquid form are also applicable to the stirred or paddle-type reaction systems as well. Those skilled in the art will appreciate that the present invention is not limited to any specific type of gas phase reaction system and can be carried out in a stirred or fluidized bed reactor. The invention can be carried out in a single reactor or multiple reactors (two or more reactors in series). In addition to well known conventional gas phase polymerizations processes, "condensed mode", including the so-called "induced condensed mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Condensed mode polymerizations are disclosed in U.S. Pat. Nos. 4,543,399; 4,588,790; 5,352,749; and 5,462,999, the disclosures of which are incorporated herein by reference in their entirety.

Liquid monomer polymerization mode is disclosed in U.S. Pat. No. 5,453,471, U.S. Ser. No. 510,375, PCT 95/09826 (US) and PCT 95/09827 (US), the disclosures of which are incorporated herein by reference in their entirety.

In accordance with the present invention, the partial pressure of the primary olefin that is polymerized in the gas phase polymerization reactor is less than about 240 psi. Preferably, the partial pressure of the primary olefin that is polymerized in the gas phase polymerization reactor is less than about 200 psi, more preferably, less than about 150 psi, and most preferably, less than about 100 psi. The primary olefin that is polymerized is the olefin monomer in the monomer mixture that is polymerized that is present in the greatest amount. If one or more olefin monomers are present in the same amount, then the partial pressure in the reactor of at least one these olefin monomers should be lower than 240 psi.

By maintaining the partial pressure of the primary olefin monomer that is polymerized below about 240 psi., the present inventors have been effective in reducing fouling from about 80% of the time to less than about 30% of the time. In addition, maintaining the partial pressure of the primary olefin monomer that is polymerized below about 240 psi., the present inventors have found that the polymerization proceeds more smoothly and produces a higher yield of polymer than if the partial pressure is above 240 psi. Similar trends have been observed when the partial pressure of the primary olefin monomer that is polymerized below about 200 psi., below about 150 psi., and below about 100 psi. Those skilled in the art are capable of maintaining the partial pressure of the primary olefin monomer that is polymerized using the guidelines provided herein.

For example, the partial pressure of propylene can be measured and adjusted as follows. Partial pressure of the primary olefin is calculated by using a gas analyzer and measuring the composition of the stream. This gas composition and the total pressure in the reactor are used to determine the partial pressure of the monomer. The feed of the propylene stream is then adjusted according to the measurement. If the value is lower than the desired value, additional propylene is fed to the reactor. If the value is higher than the desired value, less propylene is fed. In addition, the partial pressure of the propylene may be decreased by increasing nitrogen flow to the reactor. Lastly, the partial pressure may be altered by venting the reactor and/or adding other additional components.

The present inventors also have found that, when the partial pressure of the primary olefin, preferably propylene, that is polymerized is not maintained below about 240 psi., reactor fouling occurs in at least two primary areas; near the distributor plate, and across the point of injection of the unsupported catalyst in liquid form. The method of the invention effectively prevents fouling across the point of injection of the catalyst preferably by using a preactivated unsupported catalyst, and by maintaining the partial pressure below about 150 psi. The method of the invention effectively prevents fouling near the distributor preferably by maintaining the partial pressure below about 240 psi., regardless of whether the unsupported catalyst is preactivated or not.

The monomers that can be used for preparing the polymers of the invention include any olefin monomer capable of being polymerized, and preferably are those olefin monomers having from two to twelve carbon atoms, more preferably those olefin monomers having two to six carbon atoms. Preferred monomers are ethylene, propylene, butene-1, pentene-1,4-methylpentene-1 and hexene-1.

The polymers of the present invention also can include dienes, aromatic compounds with vinyl unsaturation and/or carbon monoxide. Preferred dienes are non-conjugated or conjugated diene monomers that are straight chain, branched chain or cyclic hydrocarbon dienes having from about 5 to about 15 carbon atoms. Particularly preferred dienes include 1,4-hexadiene and 5-ethylidene-2-norbornene. Preferred aromatic compounds with vinyl unsaturation that also may be polymerized include styrene and substituted styrene. Particularly preferred polymers that can be made in accordance with the present invention include ethylene homopolymers and ethylene copolymers employing one or more $C_3$–$C_{12}$ alpha olefins; propylene homopolymers and propylene copolymers employing one or more $C_4$–$C_{12}$ alpha olefins; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like.

The process of the present invention may employ any suitable additive necessary to effect, assist or otherwise complement the polymerization. For example, the process of the invention can optionally employ inert particulate materials as fluidization aids. These inert particulate materials can include carbon black, silica, talc, and clays, as well as inert polymeric materials. Carbon black has a primary particle size of about 10 to about 100 nanometers, an average size of aggregate of about 0.1 to about 10 microns, and a specific surface area of about 30 to about 1,500 $m^2$/gm. Silica has a primary particle size of about 5 to about 50 nanometers, an average size of aggregate of about 0.1 to about 10 microns, and a specific surface area of about 50 to 500 $m^2$/gm. Clay, talc, and polymeric materials have an average particle size of about 0.01 to about 10 microns and a specific surface area of about 3 to 30 $m^2$/gm. These inert particulate materials are employed in amounts ranging about 0.3 to about 80%, preferably about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives can be, and often are, employed in the polymerization process of the invention. Chain transfer agents are often used to control polymer molecular weight. Examples of these compounds are hydrogen and metal alkyls of the general formula $M^3R^5g$, where $M^3$ is a Group IA, IIA or IIIA metal, $R^5$ is an alkyl or aryl, and g is 1, 2, or 3. Preferably, a zinc alkyl is employed; and, of these, diethyl zinc is most preferred. Typical promoters include halogenated hydrocarbons such as $CHCl_3$, $CFCl_3$, $CH_3CCl_3$, $CF_2ClCCl_3$, and ethyltrichloroacetate. Such promoters are well known to those skilled in the art and are disclosed in, for example, U.S. Pat. No. 4,988,783. Other organometallic compounds such as scavenging agents for poisons may also be employed to increase catalyst activity. Examples of these compounds include metal alkyls, such as aluminum alkyls, most preferably triisobutylaluminum. Some compounds may be used to neutralize static in the fluidized-bed reactor, others known as drivers rather than antistatic agents, may consistently force the static to from positive to negative or from negative to positive. The use of these additives is well within the skill of those skilled in the art. These additives may be added to the reaction zone separately or independently from the liquid catalyst if they are solids, or as part of the catalyst provided they do not interfere with the catalyst delivery. To be part of the catalyst solution, the additives should be liquids or capable of being dissolved in the catalyst solution.

Exemplary catalysts useful in the present invention are any unsupported catalyst useful for preparing polyolefins from olefin monomers, and preferably, unsupported catalysts that are insoluble or only slightly soluble in hydrocarbon solvents. A single catalyst may be used, or a mixture of catalysts may be employed if desired. These catalysts typically are used with cocatalysts and promoters well known in the art. Examples of suitable catalysts are described in U.S. Pat. No. 5,693,727, and U.S. application Ser. No. 08/803,230 entitled "Improved Control of Solution Catalyst Droplet Size with a Perpendicular Spray Nozzle" of Williams, et al., the disclosures of which are incorporated by reference herein in their entirety.

Preferred among the various catalyst systems are catalyst compositions comprising a mixture of at least one metallocene catalyst and an activating cocatalyst, whereby the resulting mixture is soluble in hydrocarbon solvent. The metallocene catalyst first is added to the activating co-catalyst solution (the co-catalyst typically being dissolved in a hydrocarbon solvent), and then additional solvent is added to further dilute the preactivated unsupported catalyst mixture. The practice of this invention is not limited to any particular class or kind of metallocene catalyst. Accordingly, the catalyst composition may comprise any unsupported metallocene catalyst useful in slurry, solution, bulk, or gas phase olefin polymerization. One or more than one metallocene catalyst may be employed. For example, as described in U.S. Pat. No. 4,530,914, the disclosure of which is incorporated by reference herein in its entirety, at least two metallocene catalysts may be used in a single catalyst composition to achieve a broadened molecular weight distribution polymer product. Metallocene catalysts disclosed in U.S. Pat. No. 5,693,727 are particularly preferred.

Another preferred group of metallocene catalysts useful in the present invention are those having the following formula.

$$(L)_2R^1MX_{(z-2)}$$

wherein M is a metal from groups III to VIII or a rare earth metal of the Periodic Table; L is π-bonded substituted indenyl ligand coordinated to M; $R^1$ is a bridging group selected from the group consisting of $C_1$–$C_4$ substituted or unsubstituted alkylene radicals, dialkyl or diaryl germanium or silicon groups, and alkyl or aryl phosphine or amine radicals; each X is independently hydrogen, an aryl, alkyl, alkenyl, alkylaryl, or arylalkyl radical having 1–20 carbon atoms, a hydrocarboxy radical having 1–20 carbon atoms, a halogen, $NR^2_2$-, $R^2CO_2$-, or $R^2_2NCO_2$-, wherein each $R^2$ is a hydrocarbyl group containing 1 to about 20 carbon atoms; and z is the valence state of M.

Illustrative, but non-limiting, examples of this group of metallocenes include bridged dialkyl indenyl metallocenes [e.g., $(indenyl)_2M(CH_3)_2$, $(indenyl)_2M(C_6H_5)_2$, $(indenyl)_2M$ di-neopentyl, $(indenyl)_2M$ di-benzyl]; bridged mono alkyl bisindenyl metallocenes, [e.g., $(indenyl)_2M(CH_3)Cl$, $(indenyl)_2M$ neopentyl Cl, $(indenyl)_2MC_6H_5Cl$], indenyl metal di-halide complexes [e.g., $indenyl_2MCl_2$, tetra-methylindenyl$_2MCl_2$, tetra-ethylindenyl$_2MCl_2$, bis(2,4 dimethyl-indenyl)$MCl_2$]; bisfluorenyl structures [e.g., bisfluorenyl$MCl_2$, bis-nona methyl fluorenyl$MCl_2$, bis-1-methyl fluorenyl$MCl_2$]; with the following bridging groups (i.e., R in the above formula I): $Me_2Si$, $Et_2Si$, $Ph_2Si$, $MePhSi$, $MeEtSi$, $EtPhSi$, $Me_2Ge$, $Et_2Ge$, $Ph_2Ge$, $MePhGe$, $MeEtGe$, $MeCH$, $Me_2C$, $Et_2C$, $Ph_2C$, $MePhC$, $MeEtC$, $EtPhC$, $iPr_2C$, $t$-$Bu_2C$, ethylene, tetramethylethylene, diphenyl ethylene, methyl ethylene, propylene, methylamine, butylene, and methyl phosphine.

Particularly preferred for use herein are compounds selected from racemic-dimethylsilylbis(2-methyl-1-indenyl) zirconium dichloride ("SIZR2"), racemic-dimethylsilylbis (2-methyl-4-(1-naphthyl)indenyl) zirconium dichloride ("SIZR4N") and racemic-dimethylsilylbis(2-methyl-4-phenyl-1-indenyl) zirconium dichloride ("SIZR4P").

Any cocatalyst that is capable of activating the unsupported catalyst so that the combination can polymerize an olefin monomer can be used in the present invention. Preferably, the activating cocatalyst is one of the following: (a) branched or cyclic oligomeric poly(hydrocarbyl-aluminum oxide)s which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group; (b) ionic salts of the general formula $[A^+][BR^{}_{4-}]$, where $A^+$ is a cationic Lewis or Bronsted acid capable of abstracting an alkyl, halogen, or hydrogen from the metallocene catalysts, B is boron, and R is a substituted aromatic hydrocarbon, preferably a perfluorophenyl radical; and (c) boron alkyls of the general formula $BR^{}_3$, where R is as defined above.

Preferably, the activating cocatalyst is an aluminoxane such as methylaluminoxane (MAO) or modified methylaluminoxane (MMAO), or a boron alkyl. Aluminoxanes are preferred and their method of preparation is well known in the art. Aluminoxanes may be in the form of oligomeric linear alkyl aluminoxanes also can be used in the present invention.

The liquid unsupported catalyst can be composed of one or more metal compounds (i.e., unsupported catalyst) in combination with one or more co-catalysts (i.e., preactivated). Alternatively, a portion of the co-catalyst can be fed separately from the metal compound(s) to the reactor. Promoters associated with any particularly polymerization are usually added to the reactor separately from the co-catalyst and/or metal compound(s).

If the metal compound and/or the co-catalyst occurs naturally in liquid form, it can be introduced "neat" into the reactor. More likely, the liquid catalyst is introduced into the reactor as a solution (single phase, or "true solution" using a solvent to dissolve the mixture of the metal compound and the co-catalyst), an emulsion (partially dissolving the catalyst components in a solvent), suspension, dispersion, or slurry (each having at least two phases). Preferably, the liquid catalyst employed is a solution or an emulsion, most preferably a solution. As used herein, "liquid catalyst" or "liquid form" includes neat, solution, emulsion, and dispersions of the transition metal or rare earth metal component (s) of the catalyst and/or co-catalyst The solvents that can be utilized to form solutions of the unsupported olefin polymerization catalyst precursor compounds or mixtures of the unsupported catalyst and co-catalyst (i.e., the preactivated unsupported catalyst) are inert solvents, preferably non-functional and non-coordinating hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, tetrahydrofuran and the like; and petroleum fractions such as gasoline, kerosene, light oils, and the like. Likewise, halogenated solvents such as methylene chloride, chlorobenzene, and the like may also be utilized. The use of the term "inert" in this context is meant that the material being referred to is non-deactivating in the polymerization reaction zone under the conditions of gas phase polymerization and is non-deactivating with the catalyst in or out of the reaction zone. The use of the expression "non-functional" or "non-coordinating" denotes solvents that do not contain groups such as strong polar groups which can deactivate the active catalyst metal sites.

Although aromatic and halogenated solvents can be used in the context of the present invention, and are capable of dissolving unsupported catalysts that are insoluble or only slightly soluble in hydrocarbon solvents, it is preferred to avoid using such solvents for environmental reasons. Naturally, if one is not concerned with the generation of volatile aromatics and/or halogen-containing components, or if one devises a mechanism to dispose (or reduce them to non-toxic components) of them safely, then these solvents can be used. Most preferably, a solvent that is compatible with the particular solvent that is used is the solvent used to solvate the cocatalyst. In the case of MMAO, this particular co-catalyst is available from Akzo-Nobel Chemicals, Inc. as a 1.91 Molar solution in heptane, 7.2 wt. % aluminum, and when used as the co-catalyst, it is preferred that a solvent that is compatible with heptane (heptane, hexane, isopentane, etc.) is used as the solvent.

Additional solvents can be added to the mixture of the unsupported catalyst and the co-catalyst to reduce the concentration of the unsupported catalyst or preactivated unsupported catalyst. Any additional solvent can be used in the context of the present invention. Again, aromatic and/or halogen-containing solvents can be used, but it is preferred to avoid the use of these solvents for environmental reasons. Preferably, the additional solvent is an aliphatic or alicyclic hydrocarbon solvent, more preferably, the additional solvent is selected from butane, isobutane, ethane, propane, pentane, isopentane, hexane, heptane, octane, decane, dodecane, hexadecane, octadecane, and most preferably, the additional solvent is isopentane, hexane or heptane.

Generally, the unsupported catalyst in liquid form is introduced into the reactor by means of a conventional two fluid spray nozzle in which an inert gas is used to help atomize the catalyst. The use of such a spray nozzle allows for greater control of the liquid droplet size that is produced in the reaction zone by providing enhanced atomization capability. The selection of a particular spray nozzle/tip for use with the catalyst in liquid form to provide a desired average droplet size, taking into account the reaction conditions within the reactor as well as the flow rate of the catalyst, is within the knowledge of those skilled in the art. Generally, the orifice diameter in the spray nozzle/tip is in the range of from about 0.01 to about 0.15 inch, preferably from about 0.02 to about 0.05 inch.

The average particle size of the polyolefin produced in the presence of the preactivated unsupported catalyst can be controlled by adjusting the size of the liquid droplets containing unsupported catalyst, or the concentration of unsupported catalyst in the liquid droplets, or both. If both the size of the liquid droplets and the unsupported catalyst concentration in the liquid droplets are adjusted, they may be adjusted simultaneously or in sequence. Those skilled in the art are capable of controlling the size of the liquid droplets of the unsupported catalyst and/or the preactivated unsupported catalyst using the guidelines provided herein.

The size of the liquid droplets containing the preactivated unsupported catalyst can be adjusted while using an effervescent spray nozzle, such as that described in copending U.S. application Ser. No. 08/802,231 for "Improved Control of Solution Catalyst Droplet Size with an Effervescent Spray Nozzle" of Williams, et al. (the disclosure of which is incorporated by reference herein in its entirety) to spray the liquid feed stream containing the unsupported catalyst into the polymerization reactor. The size of the liquid droplets containing the catalyst also can be adjusted while using a perpendicular spray nozzle such as that described in copending U.S. application Ser. No. 08/803,230 entitled "Improved Control of Solution Catalyst Droplet Size with a Perpendicular Spray Nozzle" of Williams,et al. . (the disclosure of which is incorporated by reference herein in its entirety), to spray the liquid containing the unsupported catalyst into the polymerization reactor.

The distal end of the nozzle may be of any geometric configuration, e.g., bulbous, rounded, parabolic, conical, or semi-circular, but to limit turbulence the nozzle preferably is tapered at about 5 to 15 degrees off horizontal (the central axis of the tube). Higher taper angles can be tolerated given that the taper from horizontal is gradual. A tapered tip also minimizes fouling because of the small area available for accumulation of catalyst and polymer.

For perpendicular spraying, the liquid feed stream may be atomized with an inert carrier gas, as is done with a gas-assisted perpendicular spray nozzle. Alternately, a perpendicular pressure nozzle could be used to deliver a perpendicular spray of high-pressure liquid in the absence of an atomizing gas. Additionally, the perpendicular feeding geometry can be used with effervescent gas-liquid contact in the spraying nozzle or with an ultrasonic nozzle, or could also be applied to other known atomization devices, such as electrostatic, sonic-whistle, or rotary, etc. nozzles.

Preferably, the unsupported catalyst in liquid form is introduced intermittently or continuously into the reaction zone at a desired point above the distributor plate. Intermittent catalyst feeding may be used to help keep the catalyst solution flow rate in the proper range for optimum nozzle performance while independently maintaining the desired average catalyst feed rate. It is desirable to maintain a continuous flow of the inert carrier through the nozzle, be it a liquid or gas, at a rate sufficient to prevent fouling of the injection nozzle. Conventional metering valves or pumps can be used to deliver a precise flow of the catalyst to the reaction zone. Controlled intermittent catalyst flow may be delivered to the reaction zone using conventional syringe or positive displacement pumps.

Most preferably, the liquid unsupported catalyst is fed to the reactor in a "resin lean particle zone," as described in U.S. Pat. No. 5,693,727. A particle lean zone may be a section of the reactor which normally does not contain the fluidized bed, such as the disengaging section, the gas recirculation system, or the area below the distributor plate. The particle lean zone may also be created by deflecting resin away from the catalyst spray with a stream of gas.

Liquid unsupported catalyst in a carrier gas, particle-deflecting gas, and, when employed, a tip-cleaning gas can be introduced into the reactor at the same velocities to establish a particle lean zone. However, it is preferred that they enter the fluidization zone at differing velocities. Preferably, the liquid unsupported catalyst in the carrier gas is introduced at a velocity ranging from about 50 ft/sec to about 500 ft/sec; the particle-deflecting gas is introduced at a velocity ranging from about 10 ft/sec to about 280 ft/sec, and, when employed, the tip-cleaning gas ranges in velocity from about 50 ft/sec to about 250 ft/sec. Preferably, the pressure of the particle-deflecting gas, and, when employed, the tip-cleaning gas is about 10 to about 300 psig, preferably about 20 to about 200 psig, higher than the pressure of the gas in the fluidization zone of the reactor. Typically, the particle-deflecting gas pressure ranges from about 50 to about 600 psig; the tip-cleaning gas pressure, when employed, ranges from about 50 to 600 psig; and the liquid catalyst/carrier gas pressure ranges from about 50 to about 600 psig. When the particle-deflecting gas is the recycle gas, it is a portion comprising about 5 to about 40 percent of the total recycle flow and is preferably removed from the discharge side of the compressor. When the tip-cleaning gas is the monomer gas, it is a portion comprising about 2 to about 40 percent of the total monomer flow. The particle-deflecting gas and the tip-cleaning gas can also optionally contain one or more antifoulants or antistatic agents known to those skilled in the art. While inert gases can be employed in the present invention as the particle-deflecting and tip-cleaning gases, they can be impractical because they require increased reactor venting, thereby decreasing efficiency of monomer usage and increasing cost.

The unsupported liquid catalyst can be introduced into the polymerization zone from the side, top, or bottom of the reactor. Side feeding the liquid catalyst is generally preferred, since it requires no or little modification of a conventional commercial reactor. When the liquid unsupported catalyst is fed from a side location into the fluidization or polymerization zone of the reactor, it, along with the particle-deflecting gas and optional tip-cleaning gas, preferably enters the bed from a position that is about 10 percent to about 40 percent of the distance from the distributor plate to the top of the bed, most preferably about 15 percent to about 25 percent of the distance from the distributor plate to the top of the bed. When the liquid, unsupported catalyst is fed from the bottom of the reactor along with the particle-deflecting gas and optional tip-cleaning gas, it preferably enters the fluidized bed from a position that is at or near the center of the distributor plate in the bottom of the reactor to provide a particle lean zone. When the liquid unsupported catalyst is introduced from a location in the top of the reactor, it is preferred that it enter in such a manner so as to avoid polymerization in the expanded zone of the reactor, and, therefore, is released in the reactor at the top or just immediately above the fluidized bed. This allows the catalyst droplets to additionally coat fines which can accumulate as dust above the top of the fluidized bed.

Any catalyst delivery system that is capable of atomizing the liquid catalyst into droplets of the desired size and distribution and avoids plugging of the tip or nozzle can be employed in the present invention. One embodiment of a catalyst delivery system comprises a particle-deflecting gas tube enclosing an optional tip-cleaning gas tube which in turn encloses a catalyst injection tube. The particle-deflecting gas tube has a sufficient inside diameter for the insertion or mounting of the tip-cleaning gas tube. For a commercial fluidized bed reactor, typically the particle-deflecting gas tube has an inside diameter ranging from about 2 inches to about 12 inches, preferably about 4 to about 6 inches. The optional tip-cleaning gas tube, has an outside diameter capable of fitting inside the particle-deflecting gas tube. For a conventional reactor, typically the tip-cleaning gas tube has an inside diameter ranging from about 0.5 inches to about 1.5 inches, preferably about 0.75 to about 1.25 inches.

If a preactivated unsupported catalyst is used, it preferably is prepared by contacting the unsupported catalyst with a co-catalyst, or co-activator for a period of time sufficient to preactivate the catalyst. Simply contacting the two components in a feed line with a residence time of up to about 50 minutes, or contacting the components in a mixing tee, or in a holding tank prior to adding the solution to a gas phase reactor is not sufficient. Rather, the components need to be in contact with one another for a period of time sufficient to preactivate the unsupported catalyst. For example, SIZR4P and MMAO are known to be an effective unsupported catalyst/co-catalyst system for polymerizing olefin monomers. It also is known that SIZR4P is either insoluble, or only slightly soluble in hydrocarbon and, consequently, it typically is dissolved in toluene or methylene chloride. Even in methylene chloride, the solubility of SIZR4P is less than 21 mmol/l at room temperature. When SIZR4P and MMAO are contacted with one another in the presence of hydrocarbon, like heptane, the initial solution is yellow to yellow-orange. After sufficient contact time has passed, typically more than 30 minutes, the solution turns orange-red to deep red.

The unsupported catalyst component and the co-catalyst can be contacted with one another in any vessel, and at any temperature and pressure, so long as a preactivated unsupported catalyst is formed. Preferably, the two components are initially contacted at temperatures within the range of from −20° C. to about 50° C., more preferably, from about −10° C. to about 40° C., even more preferably from about 0–20° C., and most preferably 10–30° C. The pressure before mixing is typically atmospheric to 50 psi, and preferably 15–25 psi.

The solvent, unsupported catalyst and co-catalyst are added in such a manner that produces a preactivated unsupported catalyst whereby the ratio of the aluminum in the co-catalyst to the metal in the unsupported catalyst preferably is within the range of from about 20:1 to about 1500:1. More preferably, the ratio is within the range of from about 900:1 to about 1200:1, and most preferably, the ratio is greater than about 950:1 and less than about 1100:1.

When the components have reacted for a sufficient period of time to produce a preactivated unsupported catalyst, this preactivated unsupported catalyst may be added directly to the gas phase reactor in the form of a slurry or solution. Alternatively, the preactivated unsupported catalyst may be separated from the solution by crystallization, precipitation, filtration, drying, and the like to form a solid catalyst component that can be stored. Of course, the preactivated unsupported catalyst also can be stored in slurry or solution.

It is preferred to add the preactivated unsupported catalyst directly to the gas phase polymerization reactor. It also is preferred to pass the preactivated unsupported catalyst slurry or solution through a filter to filter out any residual solids and/or any non-preactivated unsupported catalyst that may be suspended in the mixture. Most preferably the, preactivated unsupported catalyst solution is passed through a filter having a pore size ranging from about 0.01 to about 50 microns, preferably from about 0.1 to about 20 microns, and more preferably from about 0.5 to about 10 microns. Any filtering medium can be used so long as it is capable of filtering residual solids and/or any non-preactivated unsupported catalyst from the preactivated unsupported catalyst solution. Most preferably, a one micron polypropylene bag filter is used.

The present invention provides a method of polymerizing at least one olefin monomer using a highly active unsupported catalyst that does not leave undesirable reaction products in the resulting polymer product, reduces reactor fouling, and reduces polymer agglomeration (or formation of catalyst balls) and injection tube plugging. The present invention also provides a method of polymerizing olefin monomers in the gas phase to produce polymers in high yield, and having an excellent balance of properties.

While the invention has been described in detail with reference to particularly preferred embodiments, those skilled in the art will appreciate that various modifications can be made without departing from the spirit and scope thereof. All documents described above are incorporated by reference herein in their entirety.

The following non-limiting examples will illustrate the invention more clearly, but are not intended to limit the present invention.

EXAMPLES

Example 1

Propylene was polymerized in a gas phase polymerization reactor in a method similar to that described in Brady, U.S. Pat. No. 5,317,036. A number of samples of catalyst were prepared whereby SIZR4P was used as the unsupported catalyst precursor. SIZR4P is represented by the following:

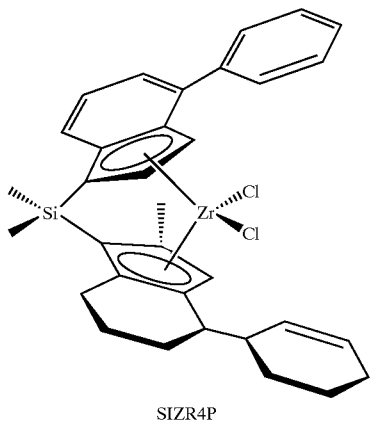

SIZR4P

Numerous samples were prepared by contacting the unsupported catalyst precursor, SIZR4P with modified methylaluminoxane, MMAO, (type 3A, 7.1 wt % Al in heptane, commercially available from Akzo-Nobel Chemicals, Inc.), and in samples 13–44, with additional isopentane (iC5) in various orders. In samples 1–9, methylene chloride was used as the solvent, and in samples 10–12, the SIZR4P was slurried in mineral oil. In each of the samples 1–12, the SIZR4P was contacted with MMAO in the presence of solvent, or mineral oil slurry, for less than 50 minutes; the contact taking place along the catalyst feed line to the polymerization reactor. In samples 13–44, the SIZR4P was contacted with MMAO for longer than 50 minutes to form a preactivated unsupported catalyst.

After preparing the preactivated unsupported catalyst composition, additional solvent then was added (except in sample 17 where no additional toluene was added) to bring the composition to its final concentration, and the compositions were fed to a gas phase polymerization reactor via a catalyst injection tube and nozzle having the following dimensions. The catalyst injection tube was standard 3/16" stainless steel tubing, with a wall thickness of 0.035 inches. The length of the tube from the catalyst slurry vessel, where the solution was stored to the reactor was approximately 10–25 feet. The nozzle was tapered tip made from 1/8 inch tubing where the inside diameter was decreased to 0.041 inches in diameter.

The concentration of the catalyst, the catalyst feed rate, Al/Zr ratio of the catalyst, bed temperature, reactor pressure and H2/propylene feed ratio all are shown in Table 1. The abbreviation "concent." denotes the concentration of the SIZR4P catalyst, Bed T is the temperature of the bed in Celcius, and Reactor P is the pressure of the reactor in pounds per square inch (psi.). Table 2 shows the propylene partial pressure in the reactor, reactor fouling at the distributor plate, reactor fouling across the injection tube, and catalyst activity. An X in Table 2 denotes fouling, whereas no mark indicates little or no fouling. The reactor was determined to have significant fouling when there was a formation of hardened polymer which may have been molten at one time found in any particular area. The formation was at least 1/4" in thickness.

TABLE 1

| Sample | Solvent | Concent. | Al/Zr | H2/C3 (molar ratio) | Bed T (deg C) | Reactor P |
|---|---|---|---|---|---|---|
| 1 | MeCl2 | 5 | 1280 | 0.0014 | 85 | 423 |
| 2 | MeCl2 | 5 | 3008 | 0.0025 | 65 | 418 |
| 3 | MeCl2 | 5 | 2163 | 0.0025 | 80 | 408 |
| 4 | MeCl2 | 5 | 1690 | 0.0025 | 70 | 398 |
| 5 | MeCl2 | 5 | 2271 | 0.0041 | 65 | 418 |
| 6 | MeCl2 | 5 | 1550 | 0.0016 | 65 | 418 |
| 7 | MeCl2 | 5 | 1460 | 0.0026 | 65 | 388 |
| 8 | MeCl2 | 5 | 1451 | 0.0025 | 85 | 378 |
| 9 | MeCl2 | 5 | 1766 | 0.0026 | 85 | 378 |
| 10 | min. oil | 0.005 | 2180 | 0.0036 | 75 | 358 |
| 11 | min. oil | 0.01 | 1868 | 0.0036 | 75 | 358 |
| 12 | min. oil | 0.015 | 825 | 0.0019 | 75 | 358 |
| 13 | IC5 | 1.35 | 506 | 0.0035 | 75 | 359 |
| 14 | IC5 | 1.6 | 500 | 0.0035 | 75 | 358 |
| 15 | IC5 | 1.6 | 500 | 0.0034 | 75 | 358 |
| 16 | IC5 | 1.2 | 520 | 0.0025 | 75 | 358 |
| 17 | IC5 | 1.48 | 500 | 0.0034 | 87 | 360 |
| 18 | IC5 | 2 | 506 | 0.0035 | 90 | 358 |
| 19 | IC5 | 2 | 506 | 0.0050 | 90 | 358 |
| 20 | IC5 | 2 | 506 | 0.0050 | 90 | 303 |
| 21 | IC5 | 2 | 506 | 0.0049 | 90 | 297 |
| 22 | IC5 | 2 | 506 | 0.0018 | 90 | 298 |
| 23 | IC5 | 2 | 506 | 0.0013 | 90 | 298 |
| 24 | IC5 | 2 | 506 | 0.0017 | 90 | 248 |
| 25 | IC5 | 2 | 506 | 0.0055 | 90 | 248 |
| 26 | IC5 | 2 | 506 | 0.0007 | 90 | 248 |
| 27 | IC5 | 2 | 506 | 0.0036 | 65 | 248 |
| 28 | IC5 | 0.85 | 1000 | 0.0074 | 75 | 298 |
| 29 | IC5 | 0.85 | 1000 | 0.0078 | 75 | 303 |
| 30 | IC5 | 0.85 | 1000 | 0.0041 | 65 | 298 |
| 31 | IC5 | 0.85 | 1000 | 0.0021 | 65 | 298 |
| 32 | IC5 | 0.85 | 1000 | 0.0079 | 75 | 301 |
| 33 | IC5 | 0.85 | 1000 | 0.0079 | 75 | 298 |
| 34 | IC5 | 0.85 | 1000 | 0.0079 | 75 | 298 |
| 35 | IC5 | 0.85 | 1000 | 0.0076 | 75 | 299 |
| 36 | IC5 | 0.85 | 1000 | 0.0036 | 75 | 348 |
| 37 | IC5 | 0.85 | 1000 | 0.0031 | 75 | 310 |
| 38 | IC5 | 0.85 | 1000 | 0.0078 | 75 | 298 |
| 39 | IC5 | 0.85 | 1000 | 0.0049 | 75 | 349 |
| 40 | IC5 | 0.85 | 1000 | 0.0079 | 75 | 298 |
| 41 | IC5 | 0.85 | 1000 | 0.0078 | 90 | 299 |
| 42 | IC5 | 0.85 | 1000 | 0.0079 | 55 | 298 |
| 43 | IC5 | 0.85 | 1000 | 0.0077 | 60 | 298 |
| 44 | IC5 | 0.85 | 1000 | 0.0078 | 75 | 299 |

TABLE 2

| Sample | C3 partial pressure psi | Distributor Plate Fouling | Fouling across from Injection | Total Pounds Produced | Calculate Productivity (lb/lb cat.) |
|---|---|---|---|---|---|
| 1 | 192 | | X | 462 | 67,708 |
| 2 | 202 | | X | 416 | 146,469 |
| 3 | 200 | | X | 225 | 112,778 |
| 4 | 201 | X | | 0.5 | 66 |
| 5 | 202 | | | 42 | 57,742 |

TABLE 2-continued

| Sample | C3 partial pressure psi | Distributor Plate Fouling | Fouling across from Injection | Total Pounds Produced | Calculate Productivity (lb/lb cat.) |
|---|---|---|---|---|---|
| 6 | 248 | | | 0.5 | 301 |
| 7 | 250 | X | | 0.5 | 601 |
| 8 | 250 | X | | 1 | 687 |
| 9 | 249 | X | | 0.5 | 687 |
| 10 | 250 | X | | 99 | 61,994 |
| 11 | 199 | X | X | 275 | 83,792 |
| 12 | 120 | | | 222 | 46,661 |
| 13 | 230 | | X | 442 | 107,417 |
| 14 | 199 | X | | 50 | 55,014 |
| 15 | 201 | | | 0.5 | 902 |
| 16 | 162 | X | X | 398 | 71,997 |
| 17 | 197 | | | 269 | 93,706 |
| 18 | 108 | | | 162 | 89,945 |
| 19 | 131 | | | 91 | 26,273 |
| 20 | 119 | | | 129 | 44,338 |
| 21 | 119 | X | X | 289 | 139,063 |
| 22 | 100 | | | 187 | 59,988 |
| 23 | 100 | | | 255 | 47,193 |
| 24 | 74 | | | 259 | 65,593 |
| 25 | 60 | | | 175 | 54,680 |
| 26 | 73 | | X | 237 | 39,875 |
| 27 | 69 | | | 204 | 33,849 |
| 28 | 77 | X | | x | 0 |
| 29 | 77 | | | 324 | 88,465 |
| 30 | 80 | | | 141 | 95,024 |
| 31 | 153 | | | 244 | 75,343 |
| 32 | 80 | X | | 400 | 109,041 |
| 33 | 80 | | | 178 | 53,599 |
| 34 | 79 | | | x | 0 |
| 35 | 82 | | | 418 | 91,012 |
| 36 | 199 | X | | 310 | 164,524 |
| 37 | 200 | X | | 90 | 191,060 |
| 38 | 81 | | | | 0 |
| 39 | 149 | X | | 252 | 138,952 |
| 40 | 79 | X | | 425 | 52,001 |
| 41 | 80 | | | 326 | 200,597 |
| 42 | 80 | | | 62 | 23,822 |
| 43 | 81 | | | 194 | 63,360 |
| 44 | 81 | | | 366 | 85,382 |

As can be seen from the above table, reactor fouling both near the distributor plate and across the injection tube are significantly reduced when the partial pressure of the primary olefin being polymerized is maintained below about 240 psi. Even further reductions in fouling are achieved at pressures below 200 psi, below 150 psi., and below 100 psi. The attendant reductions in fouling are accompanied by a corresponding increase in productivity. The following Table 3 summarizes the improvements seen in both reduction in fouling and improvement in catalyst productivity.

TABLE 3

| Partial Pressure | % fouling (distributor) | Ave. Productivity (lb/lb) |
|---|---|---|
| Above 240 | 80 | 12,854 |
| Below 240 | 28.2 | 79,923 |
| Above 200 | 50 | 56,725 |
| Below 200 | 28 | 77,958 |
| Above 150 | 52.6 | 68,041 |
| Below 150 | 20 | 74,942 |
| Above 100 | 44 | 69,822 |
| Below 100 | 17.6 | 75,450 |

It also can be seen from Tables 1 and 2, that the use of a preactivated unsupported catalyst (samples 13–44) resulted in a significant reduction in fouling at both near the distributor plate and across the injection nozzle. For example, the percentage fouling near the distributor plate for unsupported catalyst was 50% whereas that for preactivated unsupported catalyst was only 28%. In a similar vein, the percentage fouling across the injection nozzle for unsupported catalyst was 25%, whereas that for preactivated unsupported catalyst was only 12.5%. Thus, nearly a 50% reduction in fouling was achieved by preactivating the unsupported catalyst, and even greater reductions were achieved by maintaining the partial pressure of the primary olefin polymerized below 240 psi.

What is claimed is:

1. A method of polymerizing at least a propylene monomer in a gas phase polymerization reactor, comprising polymerizing at least a propylene monomer in the presence of a preactivated unsupported olefin polymerization catalyst in liquid form, wherein the preactivated unsupported olefin polymerization catalyst comprises (i) an unsupported olefin polymerization catalyst precursor and (ii) a cocatalyst that have been contacted with each other for at least about 50 minutes and whereby the partial pressure of the propylene is below about 240 pounds per square inch (psi.).

2. The method as claimed in claim 1, wherein the unsupported olefin polymerization catalyst precursor is selected from the group consisting of racemic-dimethylsilylbis(2-methyl-1-indenyl) zirconium dichloride, racemic-dimethylsilylbis(2-methyl-4-(1-naphthyl)indenyl) zirconium dichloride, and racemic- dimethylsilylbis(2-methyl-4-phenyl-1-indenyl) zirconium dichloride.

3. The method as claimed in claim 2, wherein the unsupported olefin polymerization catalyst precursor is racemic-dimethylsilylbis(2-methyl-4-phenyl-1-indenyl) zirconium dichloride.

4. The method as claimed in claim 1, wherein the unsupported olefin polymerization catalyst precursor is insoluble or slightly soluble in hydrocarbon solvents.

5. The method as claimed in claim 4, wherein the preactivated unsupported olefin polymerization catalyst precursor is prepared by contacting racemic- dimethylsilylbis(2-methyl-4-phenyl-1-indenyl) zirconium dichloride and modified methylaluminoxane (MMAO).

6. The method as claimed in claim 1, wherein the partial pressure of the primary olefin polymerized is below about 200 psi.

7. The method as claimed in claim 1 wherein the partial pressure of the primary olefin polymerized is below about 150 psi.

8. The method of claim 1, wherein the partial pressure of the propylene is below about 100 psi.

* * * * *